(12) United States Patent
Sarma et al.

(10) Patent No.: US 12,418,930 B2
(45) Date of Patent: Sep. 16, 2025

(54) SYSTEMS, METHODS, AND DEVICES FOR COEXISTENCE ENHANCEMENT USING ACKNOWLEDGMENT SIGNALS IN WIRELESS DEVICES

(71) Applicant: Cypress Semiconductor Corporation, San Jose, CA (US)

(72) Inventors: Munukutla Sandeep Sarma, Karnataka (IN); Raghavendra Kencharla, Karnataka (IN)

(73) Assignee: Cypress Semiconductor Corporation, San Jose, CA (US)

( * ) Notice: Subject to any disclaimer, the term of this patent is extended or adjusted under 35 U.S.C. 154(b) by 596 days.

(21) Appl. No.: 17/810,222

(22) Filed: Jun. 30, 2022

(65) Prior Publication Data
US 2024/0008066 A1 Jan. 4, 2024

(51) Int. Cl.
*H04W 72/50* (2023.01)
*H04W 72/23* (2023.01)
*H04W 74/0808* (2024.01)
*H04W 84/10* (2009.01)

(52) U.S. Cl.
CPC ......... *H04W 72/535* (2023.01); *H04W 72/23* (2023.01); *H04W 74/0808* (2013.01); *H04W 84/10* (2013.01)

(58) Field of Classification Search
CPC ............... H04W 72/535; H04W 72/23; H04W 74/0808; H04W 84/10; H04W 72/1215; H04W 88/06; H04W 76/10; H04B 1/40
See application file for complete search history.

(56) References Cited

U.S. PATENT DOCUMENTS

| | | | |
|---|---|---|---|
| 2002/0136268 A1* | 9/2002 | Gan ..................... | H04W 72/542 375/133 |
| 2010/0029325 A1* | 2/2010 | Wang ................. | H04W 72/1215 455/553.1 |
| 2013/0034075 A1* | 2/2013 | Zang ................... | H04W 28/065 370/329 |
| 2017/0171766 A1* | 6/2017 | Amizur ................. | H04W 24/08 |
| 2018/0227979 A1* | 8/2018 | Sato ........................ | H04L 63/18 |
| 2020/0221545 A1* | 7/2020 | Stacey .................. | H04W 84/12 |
| 2021/0279126 A1* | 9/2021 | Linsky ................ | G06F 11/1004 |

* cited by examiner

*Primary Examiner* — Michael K Phillips (57) ABSTRACT

Systems, methods, and devices implement enhanced coexistence of radios within wireless devices. Methods include receiving a data packet at a wireless device, the data packet having a packet structure, the wireless device comprising a first wireless radio collocated with a second wireless radio, and identifying one or more features of the data packet based, at least in part, on the packet structure of the data packet. Methods further include updating a medium access grant signal associated with the second wireless radio based, at least in part, on the one or more features of the data packet, the medium access grant signal determining which of the first or second wireless radios has access to a communications medium.

20 Claims, 6 Drawing Sheets

SYSTEMS, METHODS, AND DEVICES FOR COEXISTENCE ENHANCEMENT USING ACKNOWLEDGMENT SIGNALS IN WIRELESS DEVICES

TECHNICAL FIELD

This disclosure generally relates to wireless devices, and more specifically, to coexistence techniques associated with such wireless devices.

BACKGROUND

Wireless devices may communicate with each other via one or more communications modalities, such as a Wi-Fi connection and/or a Bluetooth connection. Accordingly, such wireless communication may be implemented in a manner compliant with a wireless communication protocol. Moreover, such wireless devices may be implemented in the context of one or more communications networks, and may perform network discovery and connection operations to connect to such networks. Radios included in such wireless devices may be collocated within a same device, and may share access to a communications medium. Conventional techniques for providing collocated radios with shared access to a communications medium remain limited in their ability to efficiently allocate medium usage between such collocated radios.

DETAILED DESCRIPTION

In the following description, numerous specific details are set forth in order to provide a thorough understanding of the presented concepts. The presented concepts may be practiced without some or all of these specific details. In other instances, well known process operations have not been described in detail so as not to unnecessarily obscure the described concepts. While some concepts will be described in conjunction with the specific examples, it will be understood that these examples are not intended to be limiting.

Wireless radios included in wireless devices may be collocated within the same device and may share access to a communications medium for transmit and receive operations. Such wireless radios may be compatible with different communications protocols, such as a Wi-Fi protocol and a Bluetooth protocol. Accordingly, one of the collocated radios may be a Bluetooth radio that may be configured to communicate with other Bluetooth radios in other wireless devices. More specifically, the Bluetooth radio may be configured as a Bluetooth Low Energy (BLE) radio operating in a slave mode that communicates with a BLE master radio in another wireless device. Conventional techniques for coexistence of such radios remain limited because medium usage associated with polling operations and acknowledgement signals prevents medium access by other radios, and reduces an overall efficiency of usage of the communications medium.

Various embodiments disclosed herein enhance the efficiency of collocated radios by dynamically allocating medium access to active radios. More specifically, one or more features of received data packets may be used to determine when medium access should be returned from one radio to another, thus improving efficiency of overall medium usage. As will be discussed in greater detail below, if a second radio is a Bluetooth radio operating in a slave mode, access to a communications medium may be released and returned to a first radio before the second radio performs operations associated with acknowledging receipt of empty data packets. In this way, communications medium access is returned to the first radio faster, and overall active time of the first radio is increased. As will also be discussed in greater detail below, such determinations may be made dynamically and on a packet-by-packet basis.

Figure 1:
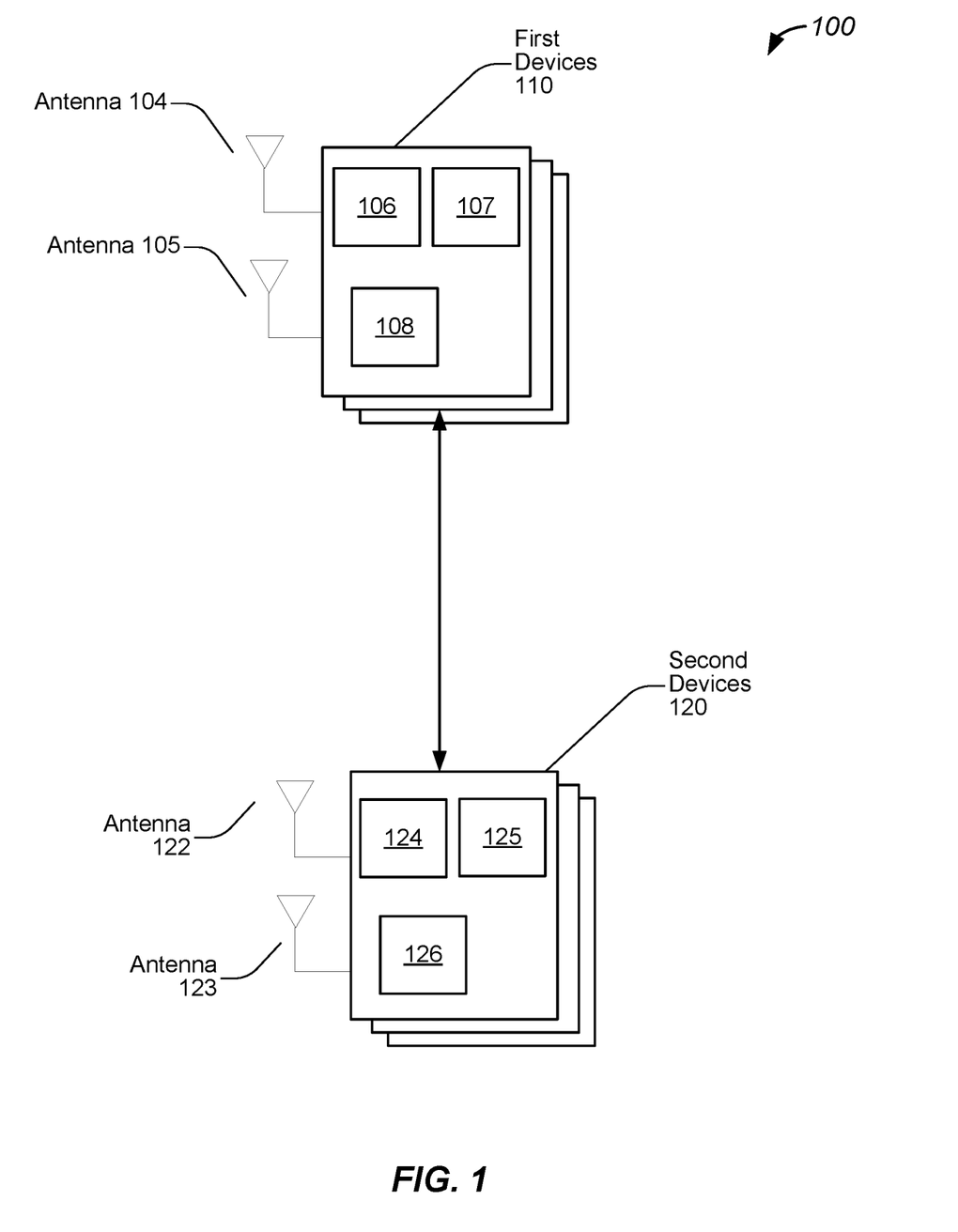
FIG. 1 illustrates an example of a system for enhancing coexistence of radios included in wireless devices, configured in accordance with some embodiments.

FIG. 1 illustrates an example of a system for enhancing coexistence of radios included in wireless devices, configured in accordance with some embodiments. As discussed above, various wireless devices may communicate with each other via one or more wireless communications media. For example, wireless devices may communicate with each other via a Wi-Fi connection or a Bluetooth connection. In various embodiments, the wireless devices may include collocated radios configured in accordance with such wireless protocols. As will be discussed in greater detail below, wireless devices disclosed herein and systems, such as system 100, that implement such wireless devices are configured to improve the efficiency of coexistence techniques used by wireless radios. More specifically, embodiments disclosed herein enable increased efficiency of medium sharing by reducing medium usage of a particular radio when responding to empty packets.

In various embodiments, system 100 may include first devices 110 which may be wireless devices. As discussed above, such wireless devices may be compatible with one or more wireless transmission protocols, such as a Wi-Fi protocol or a Bluetooth protocol. In some embodiments, first devices 110 are combination devices that include both Wi-Fi and Bluetooth radios. Accordingly, first devices 110 may include a Wi-Fi radio and a Bluetooth radio, as well as their associated processing logic. In some embodiments, radios included in first devices 110 may be compatible with a Bluetooth Low Energy specification and protocol, also referred to as Bluetooth Smart. In various embodiments, first devices 110 may be smart devices, such as those found in wearable devices, or may be monitoring devices, such as those found in smart buildings, environmental monitoring, and energy management. It will be appreciated that such wireless devices disclosed herein may be any suitable device, such as those found in cars, other vehicles, and even medical implants.

As shown in FIG. 1, various wireless devices may be in communication with each other via one or more wireless communications mediums. As shown in FIG. 1, first devices 110 may each include antennas, such as antenna 104 and antenna 105. First devices 110 may also include processing device 108 as well as radio 106 and radio 107. As used herein, a radio may refer to a transceiver as well as associated supporting processing hardware, as will be discussed in greater detail below with reference to FIG. 2. Moreover, such processing devices and radios may be configured to improve efficiency of coexistence techniques used by radio 106 and radio 107. More specifically, components of first devices 110 may be configured to reduce responses, such as acknowledgement signals, of a radio to empty packets when in a particular operational mode, thus reducing medium usage, and enabling increased usage by another collocated radio.

In some embodiments, system 100 may further include second devices 120 which may also be wireless devices. As similarly discussed above, second devices 120 may be compatible with one or more wireless transmission protocols, such as a Wi-Fi protocol or a Bluetooth protocol. Moreover, second devices 120 may also be smart devices or other devices, such as those found in cars, other vehicles, and medical implants. In various embodiments, second devices 120 may be different types of devices than first devices 110. As discussed above, each of second devices 120 may include antennas, such as antenna 122 and 123, as well as processing device 126, radio 124 and radio 125. As discussed above, second devices 120 may also be configured reduce responses of a radio to empty packets when in a particular operational mode. Additional details regarding such techniques will be discussed in greater detail below.

Figure 2:
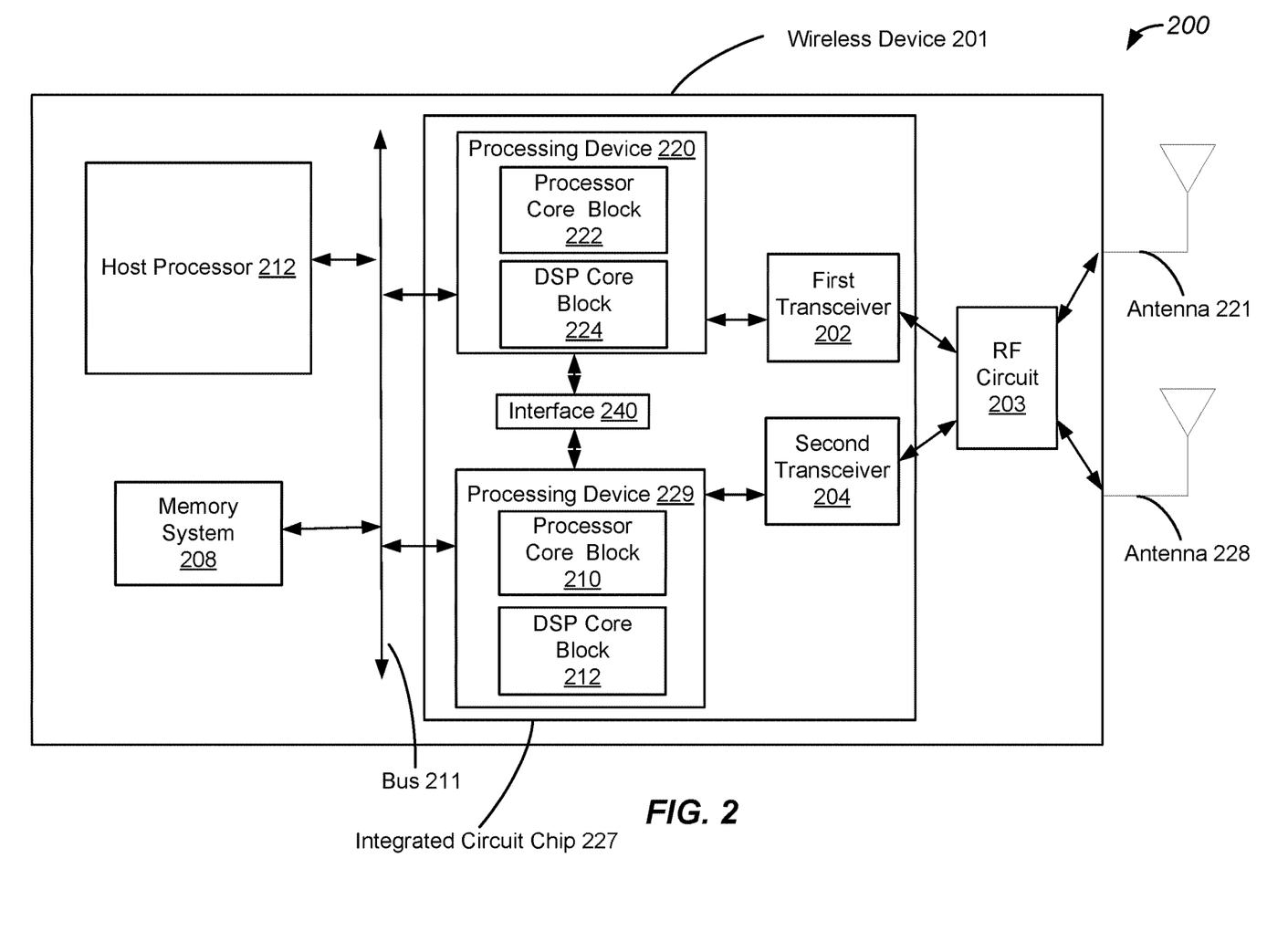
FIG. 2 illustrates an example of a device for enhancing coexistence of radios, configured in accordance with some embodiments.

FIG. 2 illustrates an example of a device for enhancing coexistence of radios, configured in accordance with some embodiments. More specifically, FIG. 2 illustrates an example of a system, such as system 200, that may include wireless device 201. It will be appreciated that wireless device 201 may be one of any of the wireless devices discussed above with reference to FIG. 1, such as first devices 110 and second devices 120.

In various embodiments, wireless device 201 includes collocated transceivers, such as first transceiver 202 and second transceiver 204, which may be included in radios such as radios 106, 107, 124, and 125 discussed above. In one example, system 200 includes first transceiver 202 which is configured to transmit and receive signals using a communications medium that may include antenna 221 or antenna 228. As noted above, first transceiver 202 may be a Bluetooth transceiver. For example, first transceiver 202 may be compatible with a Bluetooth Low Energy communications protocol. In some embodiments, system 200 also includes second transceiver 204 that may be a Wi-Fi transceiver. Accordingly, second transceiver 204 may be compatible with a Wi-Fi communications protocol, such as an 802.11ax protocol. In various embodiments, transceivers 202 and 204 each include a modulator and demodulator as well as one or more buffers and filters, that are configured to generate and receive signals via antenna 221 and/or antenna 228.

In various embodiments, system 200 further includes one or more processing devices, such as processing device 229 which may include logic implemented using one or more processor cores. Accordingly, processing device 229 is configured to implement logic for improved coexistence operations, as will be discussed in greater detail below. More specifically, processing device 229 includes processing elements configured to perform coexistence operations that will be described in greater detail below. Processing device 229 includes one or more components configured to implement a medium access control (MAC) layer that is configured to control wireless hardware associated with a wireless transmission medium, such as that associated with a Wi-Fi transmission medium. In one example, processing device 229 may include processor core block 210 that may be configured to implement a driver, such as a Wi-Fi driver. Accordingly, as will be discussed in greater detail below with reference to FIG. 4, processing device 229 may include components associated with second transceiver 204, such as MAC layers and packet traffic arbiters. Processing device 229 may further include digital signal processor (DSP) core block 212 which may be configured to include microcode.

System 200 may also include processing device 220, which may also be configured to implement logic for communications operations via one or more wireless communications protocols. For example, as will be discussed in greater detail below, processing device 220 may include processing elements configured to perform communications operations in accordance with a Bluetooth protocol. In various embodiments, processing device 220 includes processor core block 222 and DSP core block 224. Furthermore, processor core block 222 comprises multiple processor cores which are each configured to implement specific portions of a wireless protocol interface. For example, a Bluetooth protocol may be implemented using a Bluetooth stack in which software is implemented as a stack of layers, and such layers are configured to compartmentalize specific functions utilized to implement the Bluetooth communications protocol. In various embodiments, a host stack includes layers for a Bluetooth network encapsulation protocol, radio frequency communication, service discovery protocol, as well as various other high-level data layers. Moreover, a controller stack includes a link management protocol, a host controller interface, a link layer which may be a low energy link layer, as well as various other timing critical layers. In various embodiments, processor core block 222 may be configured to implement schedulers, as will be discussed in greater detail below. Processing device 220 may further include digital signal processor (DSP) core block 224 which may be configured to include microcode.

In various embodiments, system 200 additionally includes interface 240 which is configured to provide communication between processing device 229 and processing device 220. Accordingly, components of the processing devices may communicate with each other via interface 240. As will be discussed in greater detail below, interface 240 may be a coexistence interface, such as a serial enhanced coexistence interface (SECI). It will be appreciated that interface 240 may be other types of interfaces as well, such as a 2-wire interface, 3-wire interface, or a 4-wire interface. In one example, the interface may be a global co-ex interface (GCI).

System 200 further includes radio frequency (RF) circuit 203 which is coupled to antenna 221 and antenna 228. In various embodiments, RF circuit 203 may include various components such as an RF switch, a diplexer, and a filter. Accordingly, RF circuit 203 may be configured to select an antenna for transmission/reception, and may be configured to provide coupling between the selected antenna, such as antenna 221 or antenna 228, and other components of system 200 via a bus, such as bus 211. While one RF circuit is shown, it will be appreciated that wireless device 201 may include multiple RF circuits. Accordingly, each of multiple antennas may have its own RF circuit. Moreover, each one may be associated with a particular wireless communications protocol, such as a first antenna and RF circuit for Wi-Fi and a second antenna and RF circuit for Bluetooth. Moreover, while FIG. 2 illustrates system 200 as having multiple antennas, it will be appreciated that system 200 may be implemented with a single antenna.

System 200 includes memory system 208 which is configured to store one or more data values associated with coexistence operations discussed in greater detail below. Accordingly, memory system 208 includes storage device, which may be a non-volatile random-access memory (NVRAM) configured to store such data values, and may also include a cache that is configured to provide a local cache. In various embodiments, system 200 further includes host processor 212 which is configured to implement processing operations implemented by system 200.

It will be appreciated that one or more of the above-described components may be implemented on a single chip, or on different chips. For example, first transceiver 202, second transceiver 204, processing device 229, and processing device 220 may be implemented on the same integrated circuit chip, such as integrated circuit chip 227. In another example, first transceiver 202, second transceiver 204, processing device 229, and processing device 220 may each be implemented on their own chip, and thus may be disposed separately as a multi-chip module or on a common substrate such as a printed circuit board (PCB). It will also be appreciated that components of system 200 may be implemented in the context of a low energy device, a smart device, or a vehicle such as an automobile. Accordingly, some components, such as integrated circuit chip 227, may be implemented in a first location, while other components, such as antenna 221 and/or antenna 228, may be implemented in second location, and coupling between the two may be implemented via a coupler.

As discussed above, and as will be discussed in greater detail below, components of wireless device 201, such as integrated circuit chip 227, may be included in various devices and systems. For example, wireless device 201 may be included in a smart television, and one of the transceivers may be configured as a slave BLE device configured to communicate with a master BLE device, which may be a television remote or other input device, such as a joystick or touchpad. In another example, wireless device 201 may be included in smart home assistant devices, and one of the transceivers may be configured as a slave BLE device configured to communicate with a master BLE device, which may be a remote control for such a smart home device. In yet another example, wireless device 201 may be included in a wearable device, such as a smart watch, and one of the transceivers may be configured as a slave BLE device configured to communicate with a master BLE device, which may be smart phone.

While various embodiments are disclosed herein with reference to communications protocols, such as Wi-Fi protocol, it will be appreciated that any suitable protocol may be used. For example, wireless devices disclosed herein may include wireless radios compatible with a ZigBee protocol. Accordingly, a wireless device may include a Wi-Fi radio and a ZigBee radio or a Thread radio which are collocated and implement coexistence techniques as disclosed herein.

Figure 3:
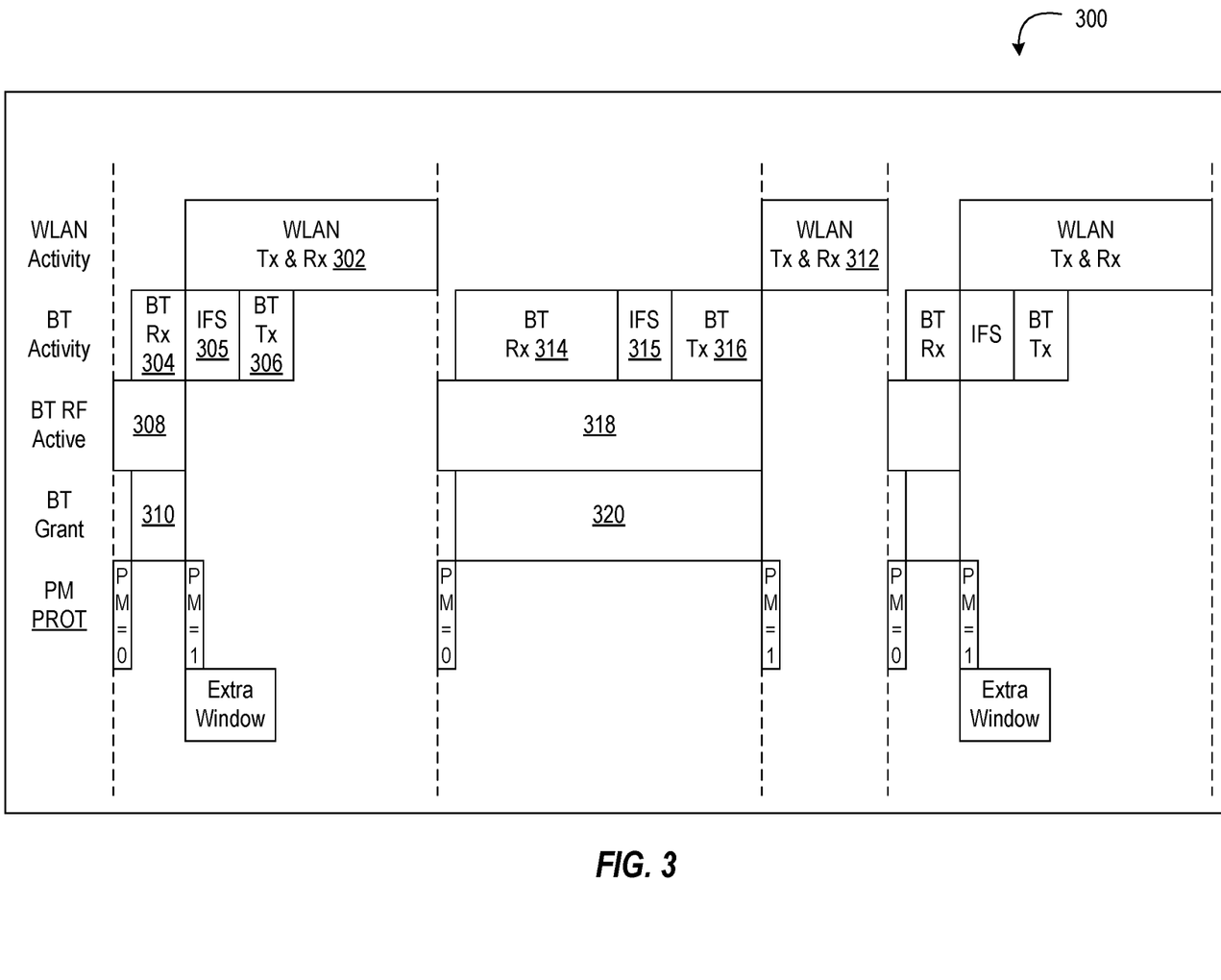
FIG. 3 illustrates an example of a timing diagram of coexistence techniques capable of enhancing coexistence of radios, performed in accordance with some embodiments.

FIG. 3 illustrates an example of a timing diagram of coexistence techniques capable of enhancing coexistence of radios, performed in accordance with some embodiments. As shown in diagram 300, a first radio, which may be a Wi-Fi radio, may schedule activity in coordination with a second radio, which may be a Bluetooth radio. Accordingly, scheduling of such activity may help prevent resource usage conflicts and may facilitate sharing of a communications medium.

As shown in diagram 300, block 302 may represent a period of time during which the first radio is active. Accordingly, during block 302, the first radio may perform one or more transmit and/or receive operations, and may use a communications medium to perform such transmit and/or receive operations. As also shown in diagram 300, there may also be activity associated with a second radio. For example, block 304 may be used for receive operations of the second radio, block 305 for interframe space (IFS), and block 306 may be used for transmit operations of the second radio. Moreover, block 308 and block 310 may represent an RF active signal and a medium access grant signal for the second radio.

In various embodiments, adjustments may be made to medium usage by each respective radio based, at least in part, on the contents of the packet. For example, subsequent operations may be performed that include block 312 for activity of the first radio, as well as block 314, block 315, and block 316 for activity of the second radio. There may also be a corresponding RF active signal and medium grant signal represented by block 318 and block 320 respectively.

As shown in diagram 300, a duration of active time of the second radio and its associated medium usage are dynamically determined based on contents of a received data packet. As will be discussed in greater detail below, if the second radio receives a data packet that includes data, an RF active signal and medium grant signal may be sustained during the duration of receive, IFS, and transmit operations of the second radio, as shown by block 318 and 320. However, if a data packet is received that is an empty data packet, such as a data packet for a polling operation that has not data payload, medium access may be immediately returned to the first radio, and the RF active signal and medium grant signal are not sustained during the IFS and transmit operations of the second radio, as shown by block 308 and 310.

Figure 4:
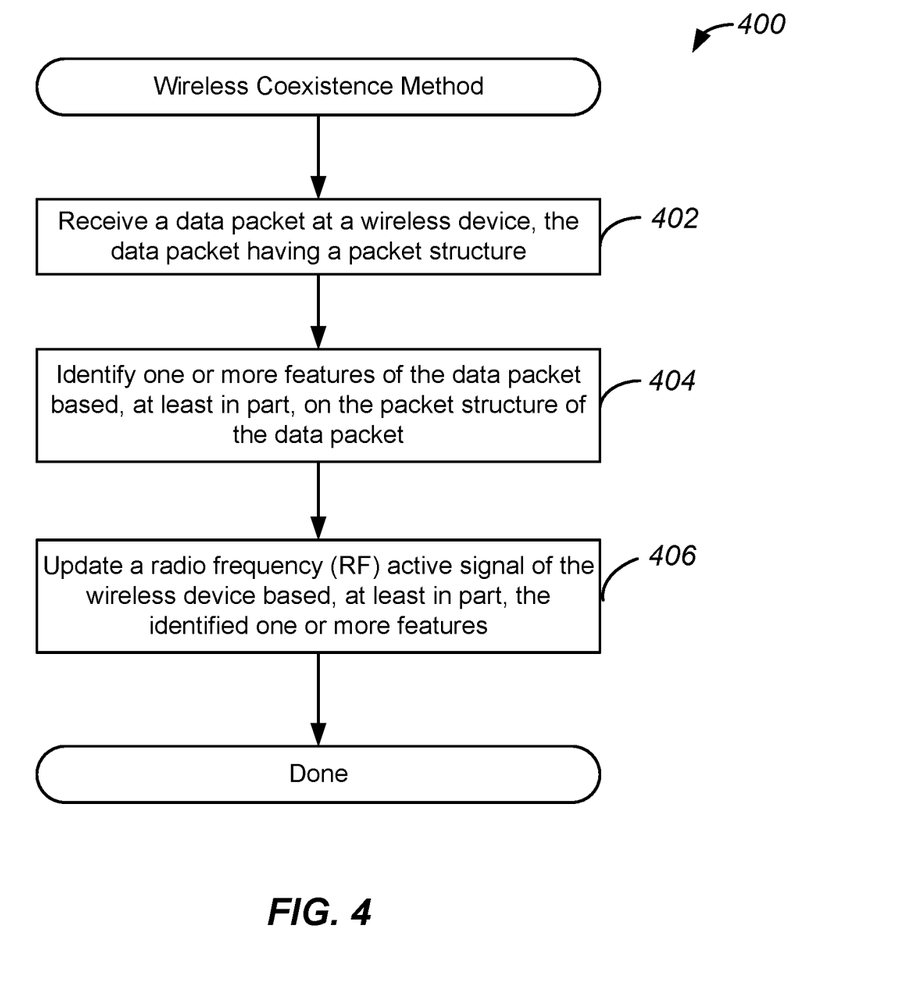
FIG. 4 illustrates flow chart of an example of a method for enhancing coexistence of radios included in wireless devices, performed in accordance with some embodiments.

FIG. 4 illustrates flow chart of an example of a method for enhancing coexistence of radios included in wireless devices, performed in accordance with some embodiments. As discussed above, various wireless devices may include collocated radios configured in accordance with such wireless protocols. As will be discussed in greater detail below, wireless methods, such as method 400, may be performed to improve the efficiency of coexistence techniques used by wireless radios. More specifically, methods enable increased efficiency of medium sharing by reducing medium usage of a particular radio when responding to empty packets.

Method 400 may perform operation 402 during which a data packet may be received at a wireless device. As similarly discussed above, the data packet may be received from another wireless device. In some embodiment, the other wireless device may be configured as a master device, and the wireless device at which the data packet is received may be configured as a slave device. Moreover, the data packet may be a Bluetooth data packet transmitted using a Bluetooth communications protocol.

Method 400 may perform operation 404 during which one or more features of the data packet may be identified. In various embodiments, the one or more features may identify what type of data packet has been received and whether or not the data packet includes a payload. For example, the data packet may be an empty data packet used for polling operations. In another example, the data packet may include data being transmitted from the master device to the slave device.

Method 400 may perform operation 406 during which an RF active signal may be updated based, at least in part, on the identified features. Accordingly, an RF active signal used within the wireless device may be updated or modified based on the identified features of the data packet. More specifically, if the data packet is an empty data packet, the RF signal may be terminated and medium access may be returned to another radio. However, if the data packet includes a data payload, the RF active signal may be maintained, and additional transmit and/or receive operations may be performed. In this way, the RF active signal and access of a wireless radio to a communication medium may be controlled dynamically and in response to particular determinations made regarding contents of a received data packet.

Figure 5:
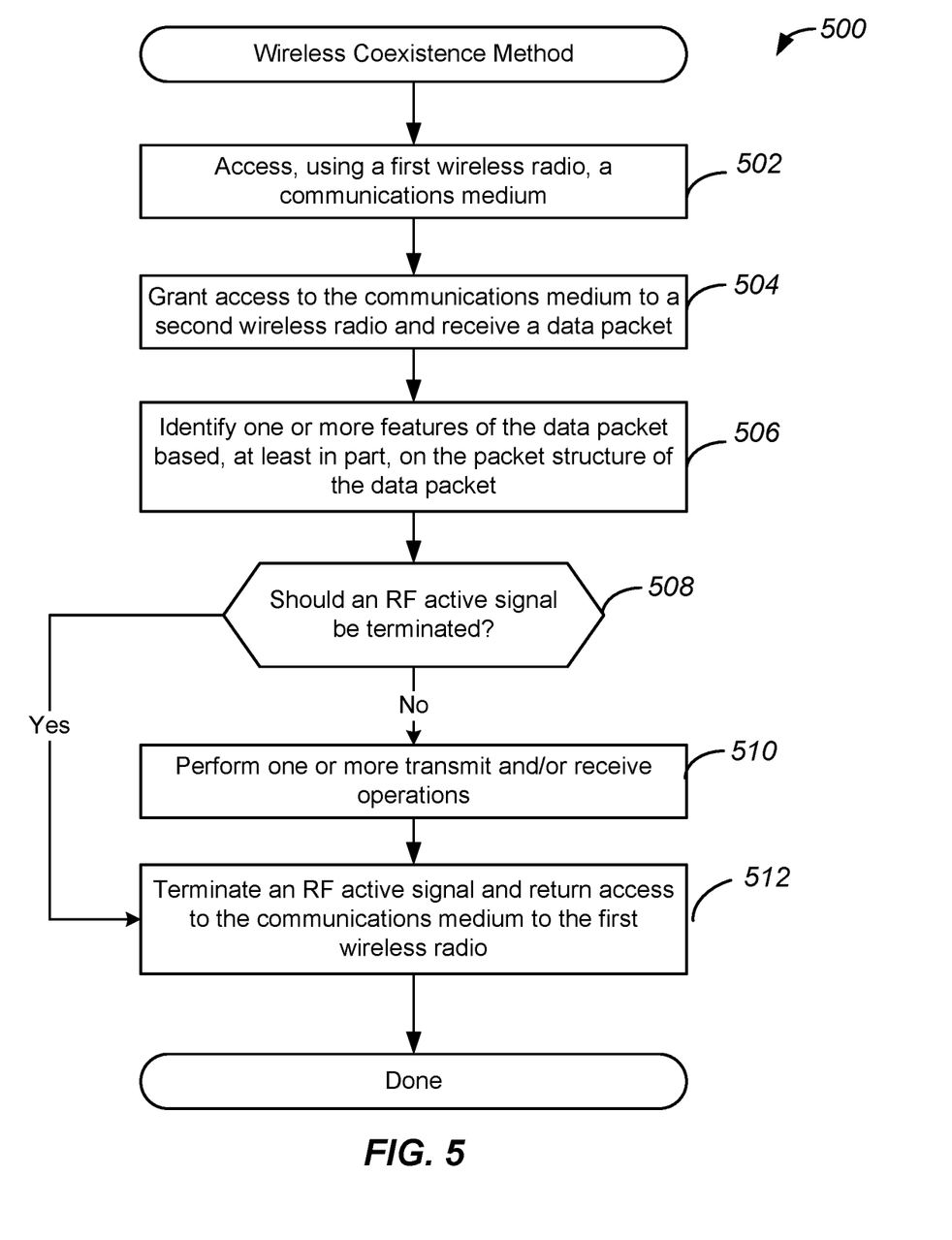
FIG. 5 illustrates flow chart of another example of a method for enhancing coexistence of radios included in wireless devices, performed in accordance with some embodiments.

FIG. 5 illustrates flow chart of another example of a method for enhancing coexistence of radios included in wireless devices, performed in accordance with some embodiments. As discussed above, various wireless devices may include collocated radios configured in accordance with various wireless protocols. As will be discussed in greater detail below, wireless methods, such as method 500, may be performed to improve the efficiency of coexistence techniques used by wireless radios. More specifically, methods enable dynamic control of an RF active signal based on contents of a received data packet, and further enable the ability to more efficiently allocate medium access by a collocated radio.

Method 500 may perform operation 502 during which a first wireless radio may use a communications medium. As similarly discussed above, the first wireless radio may be configured to be compatible with a first wireless communications protocol, such as a Wi-Fi protocol. Accordingly, during operation 502, the first wireless radio may use the communications medium to perform one or more transmit and/or receive operations in accordance with the first wireless communications protocol. It will be appreciated that during this time, a second wireless radio that is collocated with the first wireless radio is denied access to the communications medium.

Method 500 may perform operation 504 during which the second wireless radio may be granted access to the communications medium and a data packet may be received. Accordingly, medium access may be transferred from the first wireless radio to the second wireless radio, and the first wireless radio may be denied access while the second wireless radio is granted access to the communications medium. As similarly discussed above, the data packet may be received from another wireless device. In some embodiments, the other wireless device may be configured as a master device, and the wireless device at which the data packet is received may be configured as a slave device. Moreover, the data packet may be a Bluetooth data packet transmitted using a Bluetooth communications protocol. Accordingly, during operation 504, a data packet may be received by the second wireless radio from a master device.

Method 500 may perform operation 506 during which one or more features of the data packet may be identified. In various embodiments, the one or more features may identify what type of data packet has been received and whether or not the data packet includes a payload. For example, the data packet may be an empty data packet used for polling operations. In another example, the data packet may include data being transmitted from the master device to the slave device. Accordingly, the wireless device at which the data packet is received may identify a portion of the data packet based on the type of received data packet and its corresponding data packet structure, as well as identify contents of a particular portion of the data packet.

Method 500 may perform operation 508 during which it may be determined, based on the identified features, if an RF active signal should be terminated. In various embodiments, such a determination is made based, at least in part, on the contents of the data packet identified during operation 506. For example, such a determination may be made based on whether or not the data packet includes a data payload. As similarly discussed above, the data packet may be transmitted from a master device to facilitate communication between the master device and one or more slave devices. Accordingly, the data packet may include a data payload that contains data transmitted from the master device to one or more slave devices. Moreover, the data packet may be used for polling operations where the master device sends an empty data packet with no data payload to verify the presence of slave devices and the facilitate acyclic transmission of data. Accordingly, depending upon the type of data packet being transmitted by the master device, the data packet may include a data payload, or may be empty. In some embodiments, the determination made during operation 508 may be made based on one or more other features of the data packet, such as one or more identifiers representing a type of data packet that has been received. Accordingly, one or more identifiers may be used to infer whether or not the data packet includes a data payload, and the determination may be made based on such identifiers. If it is determined that the RF active signal should not be terminated, method 500 may proceed to operation 510.

Accordingly, during operation 510, the second wireless radio may perform one or more receive and transmit operations. As similarly discussed above, if the data packet includes a data payload, the RF active signal may be maintained, and additional transmit and/or receive operations may be performed. Accordingly, as similarly discussed above with reference to FIG. 3, the second wireless radio may receive data from another device, such as a master device, and may also implement an interframe space and a transmit operation in which data, such as an acknowledgement message, may be transmitted back to the master device.

Returning to operation 508, if it is determined that the RF active signal should be terminated, method 500 may proceed to operation 512, during which an RF active signal may be terminated and the access to the communications medium may be returned to the first wireless radio. As similarly discussed above, if the data packet is an empty data packet, the RF signal may be terminated and medium access may be returned to another radio. When the RF signal is terminated, the second wireless radio is also prevented from sending an acknowledgment message. In some embodiments, such denial of acknowledgement messages may be performed until a supervision timeout. In this way, medium access is immediately returned to the first wireless radio, and time associated with an interframe space and the acknowledgment message is allocated to the first wireless radio instead of the second wireless radio.

Figure 6:
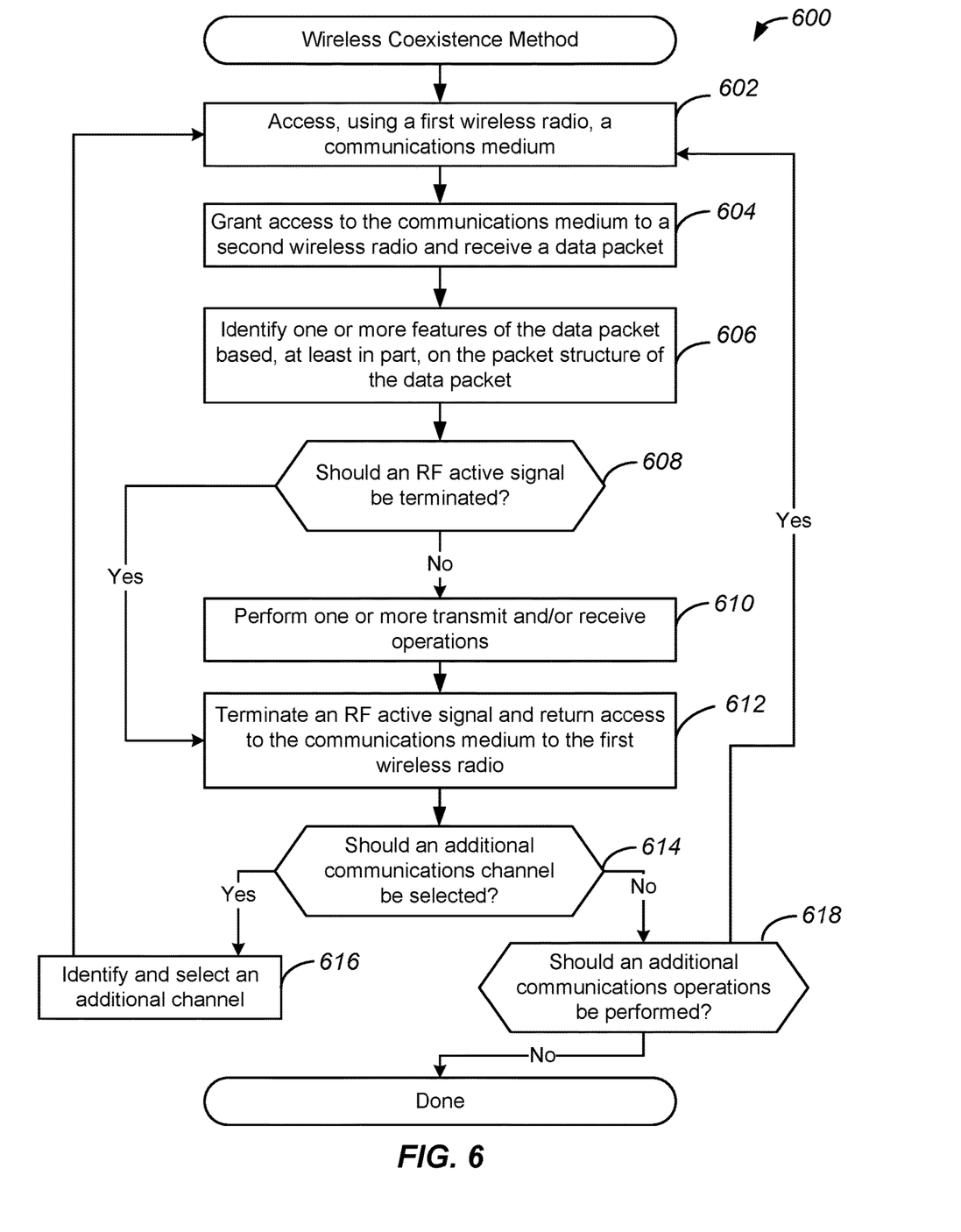
FIG. 6 illustrates flow chart of an additional example of a method for enhancing coexistence of radios included in wireless devices, performed in accordance with some embodiments.

FIG. 6 illustrates flow chart of an additional example of a method for enhancing coexistence of radios included in wireless devices, performed in accordance with some embodiments. As discussed above, various wireless devices may include collocated radios configured in accordance with such wireless protocols. As will be discussed in greater detail below, wireless methods, such as method 600, may be performed to improve the efficiency of coexistence techniques used by wireless radios. Moreover, one or more additional operations, such as channel balancing operations, may be performed to further improve the efficiency of such coexistence techniques.

Method 600 may perform operation 602 during which a first wireless radio may use a communications medium. As similarly discussed above, the first wireless radio may be configured to be compatible with a first wireless communications protocol, such as a Wi-Fi protocol. Accordingly, during operation 602, the first wireless radio may use the communications medium to perform one or more transmit and/or receive operations in accordance with the first wireless communications protocol. It will be appreciated that during this time, a second wireless radio that is collocated with the first wireless radio is denied access to the communications medium.

Method 600 may perform operation 604 during which a second wireless radio may be granted access to the communications medium and a data packet may be received. Accordingly, medium access may be transferred from the first wireless radio to the second wireless radio, and the first wireless radio may be denied access while the second wireless radio is granted access to the communications medium. As similarly discussed above, the data packet may be received from a master device, and the wireless device at which the data packet is received may be configured as a slave device. Moreover, the data packet may be a Bluetooth data packet transmitted using a Bluetooth communications protocol. Accordingly, during operation 604, a data packet may be received by the second wireless radio from a master device.

Method 600 may perform operation 606 during which one or more features of the data packet may be identified. As similarly discussed above, the one or more features may identify what type of data packet has been received and whether or not the data packet includes a payload. Accordingly, the wireless device at which the data packet is received may identify a portion of the data packet based on the type of received data packet and its corresponding data packet structure, as well as identify contents of a particular portion of the data packet.

Method 600 may perform operation 608 during which it may be determined, based on the identified features, if an RF active signal should be terminated. As similarly discussed above, such a determination is made based, at least in part, on the contents of the data packet identified during operation 606. For example, such a determination may be made based on whether or not the data packet includes a data payload, or may be made based on one or more other features of the data packet, such as one or more identifiers representing a type of data packet that has been received. If it is determined that the RF active signal should not be terminated, method 600 may proceed to operation 610.

Accordingly, during operation 610, the second wireless radio may perform one or more receive and transmit operations. As similarly discussed above, if the data packet includes a data payload, the RF active signal may be maintained, and additional transmit and/or receive operations may be performed. Accordingly, as similarly discussed above with reference to FIG. 3, the second wireless radio may receive data from another device, such as a master device, and may also implement an interframe space and a transmit operation in which data, such as an acknowledgement message, may be transmitted back to the master device.

Returning to operation 608, if it is determined that the RF active signal should be terminated, method 600 may proceed to operation 612, during which an RF active signal may be terminated and the access to the communications medium may be returned to the first wireless radio. As similarly discussed above, if the data packet is an empty data packet, the RF signal may be terminated and medium access may be returned to another radio. When the RF signal is terminated, the second wireless radio is also prevented from sending an acknowledgment message. In some embodiments, such denial of acknowledgement messages may be performed until a supervision timeout. In this way, medium access is immediately returned to the first wireless radio, and time associated with an interframe space and the acknowledgment message is allocated to the first wireless radio instead of the second wireless radio.

Method 600 may perform operation 614 during which it may be determined if an additional channel should be selected. In various embodiments, such a determination may be made based on one or more channel balancing parameters. For example, wireless devices disclosed herein may use various channels for communication, where each channel represents a portion or partition of available bandwidth on a frequency band for a wireless communications protocol. As disclosed herein, wireless devices may be configured to change channels or cycle through a set of channels to ensure a connection is maintained between a master device and a slave device. For example, channels may be periodically changed to distribute traffic across the different channels. In some embodiments, distributing traffic in this manner helps prevent the master device from determining a communications error has occurred with a slave device, or that the slave device is no longer available. More specifically, the denial the acknowledgement messages described above may, in some instance, be interpreted by the master device as a bad communications channel or a slave device being unavailable. As disclosed herein, distributing traffic across different channels reduces the likelihood that the master device will make such a determination about a particular channel.

In various embodiments, channel balancing parameters may define conditions in which a channel switch should be implemented and an additional channel should be selected. For example, if a designated amount of time has elapsed, a channel switch may be implemented. In another example, if a designated number of data packets have been received, a channel switch may be implemented. Accordingly, the channel balancing parameters may identify, among other things, an order in which channels are switched, and a designated amount of time or a designated number of data packets after which to perform a switch. If it is determined that an additional channel should be selected, method 600 may proceed to operation 616 during which an additional channel may be identified and selected. Accordingly, the additional channel may be identified and selected based on a list of channels that is traversed incrementally, or may be identified and selected based on one or more channel parameters, such as a signal quality metric which might be a received signal strength indicator (RSSI) value.

Returning to operation 614, if it is determined that an additional channel should not be selected, and a same channel should be used for communication, method 600 may proceed to operation 618 during which it may be determined if additional communications operations should be performed. Accordingly, if the wireless device is to continue receiving data from a master device, method 600 may return to operation 602. If it is determined that no additional communications operations are to be performed, method 600 may terminate.

Although the foregoing concepts have been described in some detail for purposes of clarity of understanding, it will be apparent that certain changes and modifications may be practiced within the scope of the appended claims. It should be noted that there are many alternative ways of implementing the processes, systems, and devices. Accordingly, the present examples are to be considered as illustrative and not restrictive.

What is claimed is:

1. A method comprising:
   receiving a data packet at a wireless device, the data packet having a packet structure, the wireless device comprising a first wireless radio collocated with a second wireless radio within the wireless device;
   identifying one or more features of the data packet based, at least in part, on the packet structure of the data packet, the one or more features identifying whether or not the data packet includes a data payload; and
   updating a medium access grant signal configured to grant access to a communications medium by the second wireless radio based, at least in part, on whether or not the data packet includes a data payload, the updated medium access grant signal determining which of the collocated first or second wireless radios has access to the communications medium based on whether or not the data packet includes the data payload.

2. The method of claim 1, wherein the data packet comprises no data payload and is an empty data packet configured for polling operations.

3. The method of claim 2, wherein the updating a medium access grant signal further comprises updating a radio frequency (RF) active signal.

4. The method of claim 3, wherein the updating of the medium access grant signal and the RF active signal further comprise:
   determining the data packet does not include a data payload; and
   terminating the RF active signal in response to the determining.

5. The method of claim 4 further comprising:
   terminating the medium access grant signal in response to the determining.

6. The method of claim 1 further comprising:
   selecting a channel to be used by the second wireless radio.

7. The method of claim 6, wherein the channel is selected based on one or more channel balancing parameters.

8. The method of claim 1, wherein the first wireless radio is compatible with a Wi-Fi communications protocol, and wherein the second wireless radio is compatible with a Bluetooth communications protocol.

9. The method of claim 8, wherein the data packet is a Bluetooth data packet.

10. A system comprising:
    an antenna to transmit and receive wireless signals;
    a first transceiver compatible with a first wireless communications protocol;
    a second transceiver compatible with a second wireless communications protocol, the second transceiver being collocated with the first transceiver in a same wireless device;
    processing elements configured to:
      receive a data packet via the antenna, the data packet having a packet structure;
      identify one or more features of the data packet based, at least in part, on the packet structure of the data packet, the one or more features identifying whether or not the data packet includes a data payload; and
      update a medium access grant signal configured to grant access to a communications medium by the second transceiver based, at least in part, on the one of more features of whether or not the data packet includes a data payload, the updated medium access grant signal determining which of the collocated first or second transceivers has access to the communications medium based on whether or not the data packet includes the data payload.

11. The system of claim 10, wherein the data packet comprises no data payload and is an empty data packet configured for polling operations.

12. The system of claim 11, wherein the updating a medium access grant signal further comprises updating a radio frequency (RF) active signal.

13. The system of claim 12, wherein the processing elements are further configured to:
    determine the data packet does not include a data payload;
    terminate the RF active signal in response to the determining; and
    terminate the medium access grant signal in response to the determining.

14. The system of claim 10, wherein the processing elements are further configured to:
    select a channel to be used by the second transceiver, wherein the channel is selected based on one or more channel balancing parameters.

15. The system of claim 10, wherein the first transceiver is compatible with a Wi-Fi communications protocol, wherein the second transceiver is compatible with a Bluetooth communications protocol, and wherein the data packet is a Bluetooth data packet.

16. A device comprising:
    a memory configured to store data values associated with data packets received at a first wireless radio and a second wireless radio collocated in a wireless device; and
    processing elements configured to:
      receive a data packet having a packet structure;
      identify one or more features of the data packet based, at least in part, on the packet structure of the data packet, the one or more features identifying whether or not the data packet includes a data payload; and
      update a medium access grant signal configured to grant access to a communications medium by the second wireless radio based, at least in part, on whether or not the data packet includes a data payload, the updated medium access grant signal determining which of the collocated first or second wireless radios has access to the communications medium based on whether or not the data packet includes the data payload.

17. The device of claim 16, wherein the data packet comprises no data payload and is an empty data packet configured for polling operations.

18. The device of claim 17, wherein the processing elements are further configured to:
    determine the data packet does not include a data payload;
    terminate a radio frequency (RF) active signal in response to the determining; and
    terminate the medium access grant signal in response to the determining.

19. The device of claim 16, wherein the processing elements are further configured to:
  select a channel to be used by the second wireless radio, wherein the channel is selected based on one or more channel balancing parameters.

20. The device of claim 16, wherein the first wireless radio is compatible with a Wi-Fi communications protocol, wherein the second wireless radio is compatible with a Bluetooth communications protocol, and wherein the data packet is a Bluetooth data packet.

* * * * *